(12) United States Patent
Smith

(10) Patent No.: US 9,311,103 B2
(45) Date of Patent: Apr. 12, 2016

(54) APPARATUS FOR SWITCHING A PLURALITY OF ALUS BETWEEN TREE AND CASCADE CONFIGURATIONS

(71) Applicant: STMicroelectronics (Research & Development) Limited, Marlow, Buckinghamshire (GB)

(72) Inventor: David Smith, Bristol (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 349 days.

(21) Appl. No.: 13/763,838

(22) Filed: Feb. 11, 2013

(65) Prior Publication Data

US 2013/0166890 A1      Jun. 27, 2013

Related U.S. Application Data

(63) Continuation of application No. 12/642,682, filed on Dec. 18, 2009, now abandoned.

(30) Foreign Application Priority Data

Jan. 9, 2009   (EP) .................................... 09150342

(51) Int. Cl.
*G06F 9/30* (2006.01)
*G06F 9/38* (2006.01)

(52) U.S. Cl.
CPC ............ *G06F 9/3885* (2013.01); *G06F 9/3001* (2013.01); *G06F 9/30145* (2013.01); *G06F 9/3853* (2013.01); *G06F 9/3875* (2013.01)

(58) Field of Classification Search
None
See application file for complete search history.

(56) References Cited

U.S. PATENT DOCUMENTS 4,819,155 A      4/1989  Wulf et al.
6,675,376 B2 *   1/2004  Ronen et al. .................. 717/151

FOREIGN PATENT DOCUMENTS

EP            1050800 A1      11/2000

OTHER PUBLICATIONS

European Search Report, Application No. 09150342, May 28, 2009, 7 pages.
Sohie, Guy, "A Digital Signal Processor with IEEE Floating-Point Arithmetic", 8207 I.E.E.E. Micro, 8 (Dec. 1988), No. 6+index, New York, NY, USA, pp. 49-67.
Kogge, P.M., "The Architecture of Pipelined Computers", 1981, McGraw-Hill, New York, USA, XP002527217, pp. 57-66 and 115-119.
Ozawa, et al.: "Performance Evaluation of Cascade ALU Architecture for Asynchronous Super-Scalar Processors," 2001, IEEE.

* cited by examiner

*Primary Examiner* — Corey S Faherty
(74) *Attorney, Agent, or Firm* — Gardere Wynne Sewell LLP

(57) ABSTRACT

An arrangement of at least two arithmetic logic units carries out an operation defined by a decoded instruction including at least one operand and more than one operation code. The operation codes and at least one operand are received and corresponding executions are performed by the arithmetic logic units on a single clock cycle. The result of the execution from one arithmetic logic unit is used as an operand by a further arithmetic logic unit. The decoding of the instruction is performed in an immediately preceding single clock cycle.

19 Claims, 5 Drawing Sheets

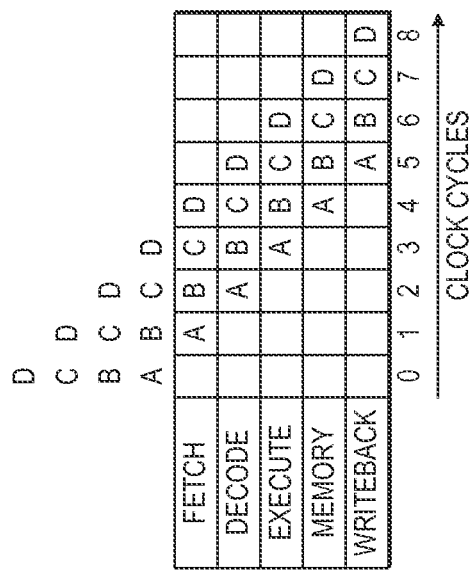

| BITS 52-47 | BITS 46-41 | BITS 40-36 | BITS 35-31 | BITS 30-26 | BITS 25-21 | BITS 20-16 | BITS 15-11 | BITS 10-0 |
|---|---|---|---|---|---|---|---|---|
| OPCODE A | OPCODE B | OPCODE C | Rz | Ra | Rb | Rc | Rd | EXTENSION |

FIG. 5

| OPCODE A | OPCODE B | OPCODE C | Rz | Ra | Rb | Rc | Rd | EXTENSION |
|---|---|---|---|---|---|---|---|---|
| ROTATE | ADD | ADD | R12 | R10 | 16 | R10 | R7 | — |

FIG. 7

APPARATUS FOR SWITCHING A PLURALITY OF ALUS BETWEEN TREE AND CASCADE CONFIGURATIONS

PRIORITY CLAIM

This application is a continuation of U.S. patent application Ser. No. 12/642,682, filed Dec. 18, 2009, which claims priority from European Application for Patent No. 09150342.5 filed Jan. 9, 2009, the disclosures of which are hereby incorporated by reference.

BACKGROUND

1. Technical Field

The present invention relates to an apparatus comprising a plurality of arithmetic logic units.

2. Description of Related Art

A number of encryption/decryption algorithms exist which use simple integer arithmetic and logic instructions. These algorithms are typically characteristic in that they contain rounds of instructions and often have a high dependency on the result of the previous operation. It is desirable to implement these algorithms in a manner which is both fast but still relatively flexible.

An example of such an algorithm is the Multi-2 algorithm as described by ISO 9979/009 and U.S. Pat. No. 4,982,429 (the disclosures of which are hereby incorporated by reference). The Multi-2 algorithm describes encipher and deciphering through shifting bits.

Encryption/Decryption algorithms like Multi-2 typically use rounds. A round is a series of steps to be carried out on a block of data to be encrypted or decrypted. The round of instructions is repeated multiple times on the block of data before that block can be considered fully encrypted or decrypted.

Each step in the round may contain multiple instructions. Each instruction in the step is generally dependent on the result of the previous instruction in that step. The next step in the round will be dependent on the result of the last instruction in the previous round. In this manner encryption/decryption algorithms exhibit a high level of dependence.

Previously, these types of algorithms have been implemented in fixed hardware or on generic microprocessors.

Fixed Hardware is designed for the task of running a particular algorithm. Hardware designed for this single task is generally very small and fast. However, the algorithm is fixed and therefore fixed hardware can only be used for a single algorithm.

Generic microprocessors can be used to implement these algorithms, although they are much slower than implementing the algorithm through fixed hardware. However, implementing these algorithms on a generic microprocessor is desirable because it allows greater flexibility and various algorithms may be implemented through variations in the software. Generic microprocessors implement these algorithms using an instruction pipeline.

For purposes of discussion, reference is made to the "DLX" architecture for a microprocessor as discussed by Hennessy & Patterson in their book "Computer Architecture—a Quantitative Approach" (the disclosure of which is incorporated by reference).

FIG. 1 shows the DLX pipeline. The pipeline consists of five stages namely, Fetch 1, Decode 2, Execute 3, Memory 4 and Write-back 5. It will be appreciated that this FIG. 1 only shows those part of the pipeline of interest and a number of parts have been omitted for clarity.

The Fetch stage 1 consists of an output of an Instruction Memory 20 connected to an Instruction Fetch/Instruction Decode (IF/ID) block 30. The IF/ID block 30 is in both the Fetch 1 and Decode 2 stages. On the Decode stage 2 side, IF/ID block 30 is connected to a Registers block 40. The Registers block 40 is connected to an Instruction Decode/Execute (ID/EX) block 50 which is in both the Decode 2 and Execute 3 stages. The Registers block 40 is also connected to a Memory/Write-back (MEM/WB) block 90 which is in both the Memory 4 and Write-back 5 stages.

The Execute stage 3 side of the ID/EX block 50 has two operand outputs R1 and R2 and an operation code output opcode. The Execute stage 3 also contains an ALU 60. The ALU 60 has two operand inputs R1 and R2 from ID/EX block 50 and an operation code input opcode from ID/EX block 50. The output of ALU 60 is input into an Execute/Memory (EX/MEM) block 70 which is in both the Execute 3 and Memory 4 stage of the pipeline.

The Memory stage 4 side of the EX/MEM block 70 is connected to a Data Memory block 80. Data Memory block 80 is further connected to the MEM/WB block 90, which as previously discussed, is connected to the Registers block 40.

As mentioned above, the pipeline of FIG. 1 has five stages. Each stage is capable of operating simultaneously with the other stages. The operation of a typical pipeline as depicted in FIG. 1 is described below with reference to FIG. 2.

FIG. 2 shows the progression of instructions through the five stages of the pipeline depicted in FIG. 1 for each clock cycle. The pipeline begins at clock cycle 0 with four instructions A, B, C and D waiting in the instruction memory.

The Execute stage 3 of pipeline depicted in FIG. 1 consists of a single Arithmetic Logic Unit 60 with two operand inputs R1 and R2 and an opcode input. The Execute stage is only capable of carrying out one operation per clock cycle and instructions A, B, C and D only contain one operation each.

In clock cycle 1, instruction A is fetched from the instruction memory 20 during the Fetch stage 1. In the clock cycle 2, A moves to the Decode stage 2 and B is fetched from memory 20. In the Decode stage 2, operation code is extracted from A and its operands are determined. The operation code determines an operation which is to be carried out on the operands of A. The ALU 60 is typically capable of carrying operation such as AND, OR, NOT, XOR, addition, subtraction and bit shifting operations.

In the third clock cycle, A moves to Execute stage 3. B moves to Decode stage 2 while C is fetched from the instruction memory. An operand is extracted from B and operands are determined while in the Decode stage 2. In the Execute stage 3, A's opcode and two operands are input into ALU 60. ALU 60 performs and operation on the operands and outputs the result.

In the fourth and fifth clock cycle, A moves to the MEM stage and Write-back respectively. The remaining instructions progress through the pipeline in the same manner as described above until finally the result of instruction D is stored in the register file 40 during Write-back stage 5 in the eighth clock cycle.

The Multi-2 algorithm was designed to be implemented on a generic microprocessor. The algorithm may consist for example of N steps, some of the steps consist of multiple instructions and the algorithm may consist of N×M instructions in total. As discussed with reference to FIG. 2, the Execute stage 2 of the pipeline of FIG. 1 has only one ALU 60 and can only carry out one operation per clock cycle. Because this algorithm was designed for implementation on a generic processor such as that shown in FIG. 1, each instruction in the algorithm carries out only one operation.

FIG. 3 depicts an example of the instruction encoding of the pipeline of FIG. 1. Bits 31 to 26 of the encoded instruction of FIG. 3 contains an operation code OPCODE, bits 25 to 21 contain a destination register Rz, bits 20 to 16 contain a first operand Ra, bits 15 to 11 contain a second operand Rb and bits 10 to 0 are reserved for extensions.

Each instruction of the algorithm is fetched from the instruction memory and decoded by Decode stage 2. In Decode stage 2, the operation code and two operands are extracted from the instruction before it is executed. Each operation must move through all the stages of the pipeline of FIG. 1 similar to that of FIG. 2.

The Multi-2 algorithm implemented in this manner may take an average of seven instructions per round considering that a typical implementation of the algorithm requires 32 rounds to encrypt an 8-byte block, nearly 200 instructions are required to pass through the pipeline to encrypt the 8-byte block.

Several suggestions have been proposed in order to speed up the implementation of encryption/decryption algorithms, such as the above, on generic microprocessors.

Previously it has been suggested that the performance of a microprocessor may be improved by increasing the clock speed of the processor. Increasing the clock speed may be disadvantageous in terms of increased power dissipation and the need to interface across heterogeneous clock domain boundaries.

It has also been suggested that performance may be improved by parallelizing the instructions. When instructions are parallelized, multiple pipelines execute multiple instructions simultaneously, however algorithms with high dependency do not benefit from this because each calculation still depends on the result of the previous operation.

It has also been suggested that the inclusion of additional, customized instructions will increase performance. For example, Multi-2 may be improved with the inclusion of multi-operation instructions such as "Rotate A by 1 bit, add to A, and subtract 1" and "Rotate A by two bits, add to A, and add 1". However these instructions are specific to a particular algorithm and any new algorithms will have to be implemented with the traditional single-operation instructions.

SUMMARY

According to a first aspect, there is provided an apparatus for encrypting and/or decrypting data comprising: a plurality of arithmetic logic units, wherein each arithmetic logic unit is arranged to carry out an operation determined by one of a plurality of operation codes received by said arithmetic logic units on at least one operand, wherein said operation codes and said operands are received on a first clock cycle; the at least one arithmetic logic unit configured to output the result of the operation carried out by that at least one arithmetic logic unit to at least one further arithmetic logic unit; one of said arithmetic logic units having an output configured to output a result of said operation on the next clock cycle.

At least one arithmetic logic unit may be a first arithmetic logic unit and the further arithmetic logic unit may be a second arithmetic logic unit and the result of the operation carried out by the first arithmetic logic unit may form the at least one operand of the second arithmetic logic unit.

At least one operand of the first arithmetic logic unit may be received from a first control unit. The first arithmetic logic unit may receive a second operand from the first control unit.

At least some of said plurality of arithmetic logic units may be arranged in a cascaded manner such that respective successive arithmetic logic units may be arranged to receive an operand from a respective preceding arithmetic logic unit.

At least some of said plurality of arithmetic logic units may be arranged to receive an operand from a common control unit.

At least one of said plurality of arithmetic logic units may receive said operation code from a control unit.

At least one arithmetic logic unit may be arranged to receive respective operands from at least two other arithmetic logic units.

The operation code received by each respective said plurality of arithmetic logic units may be determined by an instruction.

The plurality of operation codes may form a round.

An integrated circuit may comprise the apparatus.

An encryption/decryption engine may comprise the apparatus as described above.

The device may form an execute stage of a pipeline.

The apparatus may comprise at least one of a Fetch stage, Decode stage and Write-back stage of the pipeline.

According to another aspect, there is provided a method for encrypting and or decrypting data comprising: carrying out on an arrangement of a plurality of arithmetic logic units an operation determined by one of a plurality of operation codes received by said arithmetic logic units on at least one operand; receiving said plurality of operation codes and said at least one operand on a first clock cycle; outputting the result of the operation from at least one arithmetic logic unit to at least one further arithmetic logic unit; outputting a result of said plurality of arithmetic logic units on the next clock cycle.

In an embodiment, an apparatus comprises: a plurality of arithmetic logic units, wherein each arithmetic logic unit is arranged to carry out an operation determined by a received operation code on at least one received operand, wherein a first one of the arithmetic logic units is configured to carry out a first operation defined by a first operation code and output a first result to an operand input of a second one of the arithmetic logic units; wherein the second one of the arithmetic logic units is configured to carry out a second operation defined by a second operation code on the first result to output a second result; and wherein said first and second operation codes and said at least one operand are decoded from a single instruction; and wherein the first and second operations are carried out by the first and second arithmetic logic units during a single clock cycle.

In another embodiment, an execution stage comprises: an instruction decoder configured to decode an instruction in a single first clock cycle and output at least one operands and a plurality of opcodes; a first arithmetic logic unit configured to receive a first one of the plurality of opcodes and said at least one operand, the first arithmetic logic unit adapted to perform an arithmetic logic operation defined by the first opcode on said at least one operand to output a first output operand; a second arithmetic logic unit configured to receive a second one of the plurality of opcodes and said first output operand, the second arithmetic logic unit adapted to perform an arithmetic logic operation defined by the second opcode on the first output operand to output a second output operand; and wherein the arithmetic logic operations are carried out by the first and second arithmetic logic units during a single second clock cycle immediately following said single first clock cycle.

In another embodiment, an execution stage comprises: an instruction decoder configured to decode an instruction and output from said decoded instruction a first operand, a second operand, a first opcode, a second opcode and a third opcode; a first arithmetic logic unit configured to receive the first opcode and the first and second operands, the first arithmetic logic unit adapted to perform a first arithmetic logic operation defined by the first opcode on said first and second operands to output a fourth operand; a second arithmetic logic unit configured to receive the second opcode and the third and fourth operands, the second arithmetic logic unit adapted to perform a second arithmetic logic operation defined by the second opcode on the third and fourth operands to output a fifth operand; and wherein the first and second arithmetic logic operations corresponding to the decoded instruction are carried out by the first and second arithmetic logic units during a same single clock cycle.

In another embodiment, a method comprises: decoding an instruction in a single first clock cycle to output from the decoded instruction a first operand, a second operand, a first opcode, a second opcode and a third opcode; performing a first arithmetic logic operation defined by the first opcode on said first and second operands to output a fourth operand; performing a second arithmetic logic operation defined by the second opcode on the third and fourth operands to output a fifth operand; and wherein performing the first and second arithmetic logic operations corresponding to the decoded instruction comprises carrying out the first and second arithmetic logic operations on corresponding first and second arithmetic logic units during a same single clock cycle

BRIEF DESCRIPTION OF THE DRAWINGS

For a better understanding of the present invention and as to how the same may be carried into effect, reference will now be made, by way of example only, to the accompanying drawings in which:

FIG. 2 illustrates the progression of a set of instructions through a typical pipeline;

FIG. 3 illustrates the encoding of a typical instruction;

FIG. 5 illustrates a typical encoding of an instruction used in accordance with the pipeline shown in FIG. 4;

FIG. 7 illustrates a specific encoding of a single instruction.

DETAILED DESCRIPTION OF THE DRAWINGS

Embodiments are described herein by way of reference to particular example scenarios. In particular, the embodiments are described in relation to programmable encryption/decryption engines or processors forming part of an encryption/decryption engine, although not restricted thereto. The embodiments are of particular value to encryption/decryption engines running algorithms that use simple integer arithmetic and logic instructions.

By way of example only, embodiments may be used for confidentially applications, hash functions, authentication or data integrity. Other embodiments may be used in different applications.

Some embodiments may be used in the implementation of the MULTI2 algorithm. Of course, alternative embodiments may be used with other algorithms.

A conventional example of the instructions that would be used to implement the Multi-2 algorithm is shown below.

Step 2052:
R1=XOR M1, M2
Step 2053:
R2=ADD R1, K1
Step 2054:
R3=ROTATE R2, 2
R3=ADD R2, R3
R3=ADD R3, 1
Step 205
R4=ROTATE R3, 4
R4=XOR R4, R3
Step 2056:
R5=XOR R4, M1 (R5="WORK 1")
Step 2057:
R6=ADD R5, K2
Step 2058:
R7=ROTATE R6, 2
R7=ADD R7, R6
R7=ADD R7, 1
Step 2059:
R8=ROTATE R7, 8
R8=XOR R8, R7
Step 2060:
R9=ADD R8, K3
Step 2061:
R10=ROTATE R9, 2
R10=ADD R10, R9
R10=ADD R10, 1
Step 2062:
R11=ROTATE R10, 16
R12=AND R10, R7
R12=ADD R11, R12
Step 2063:
R13=XOR R12, "WORK 2" (R13=WORK2')
Step 2064:
R14=ADD R13, K4
Step 2065:
R15=ROTATE R14, 2
R15=ADD R15, R14
R15=ADD R15, 1
Step 2066:
R16=XOR "WORK 1", R15 (R16=WORK1')
Step 2067:
R17=XOR R13, R16 (R17=WORK2")

The above algorithm consists of 16 steps that make up the encryption or decryption algorithm. Some of the steps contain multiple instructions. For example step 2054 contains three instructions. The first instruction in step 2054 uses the result of the last instruction in step 2053 as an operand. The second instruction in step 2054 uses the result of the first instruction in step 2054 as an operand and also the result of the last instruction in step 2053. The third instruction step 2054 uses the result of the second instruction of that step.

Alternatively in step 2062, the third instruction in that step requires the result of both the first instruction and the second instruction in that step. The first and second instructions both use the results of previous steps as their operands.

MULTI2 is a symmetric block cipher algorithm based on permutation-substitution calculation.

MULTI2 can have any suitable round number. In some applications, a round number of 32 or more maybe used.

MULTI2 may have the following interface parameters: Input size 64 bits; Output size 64 bits; Key Length: data key 64 bits; system key 256; Round number—positive integer.

It should be appreciated that these values are by way of example only and different values can be used in different embodiment of the invention.

Figure 1:
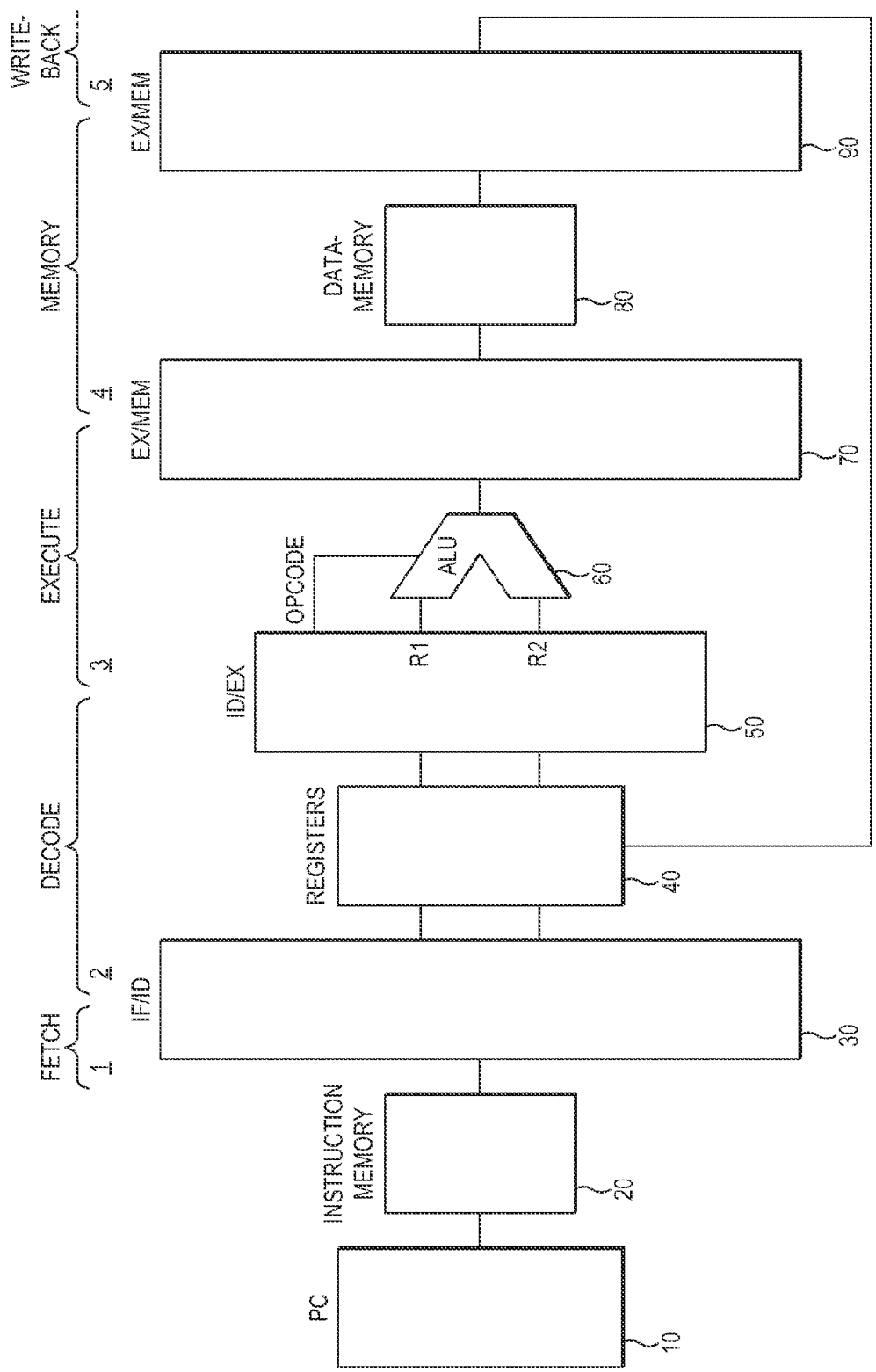
FIG. 1 shows the DLX pipeline as an example of a typical pipeline.
Figure 4:
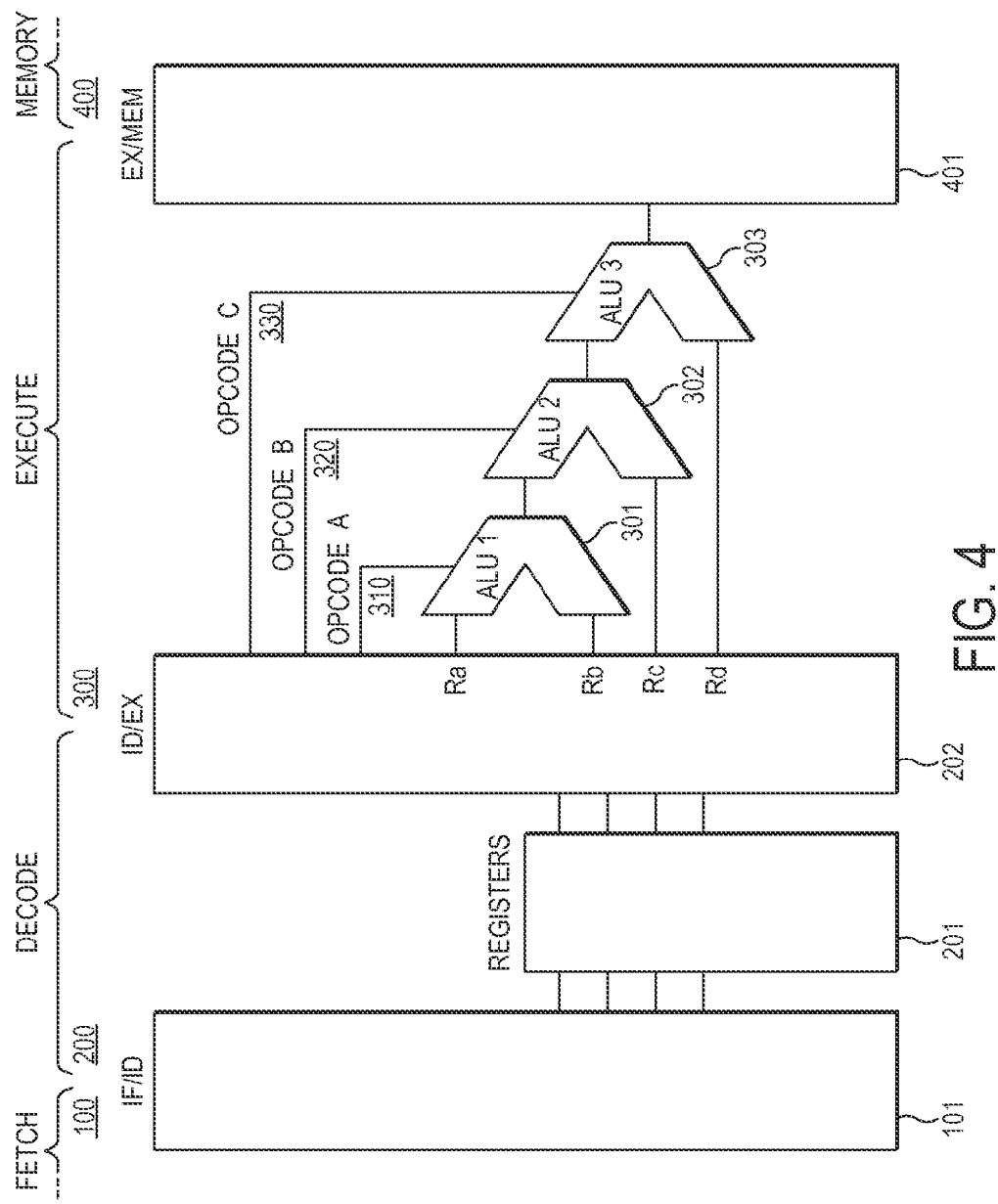
FIG. 4 schematically shows a pipeline in accordance with an embodiment.

FIG. 4 illustrates an instruction pipeline embodying the present invention.

For purposes of illustration, a DLX pipeline architecture with modifications is used. However, it is considered that the invention may be applied to a variety of architectures and is not restricted to the DLX architecture. It should be appreciated that in practice there may be additional elements to those shown in FIG. 4.

FIG. 4 illustrates four stages of an instruction pipeline. The fifth stage Write-Back has not been included for clarity. FIG. 4 shows the Fetch 100, Decode 200, Execute 300 and Memory 400 stages of the pipeline and each stage contains the blocks of the pipeline that carry out these stages.

The Instruction Fetch/Instruction Decode (IF/ID) block 101 is in both the Fetch 100 and Decode 200 stages of FIG. 4, as it carries out some functionality of both these stages. On the Decode stage 200 side, the IF/ID block 101 is connected to the Registers block 201 by four lines. It will be appreciated that this is by way of illustration only and the IF/ID block 101 and the Registers block 201 may be connected by a varying amount of lines.

The Registers block 201 is connected to an Instruction Decode/Execute (ID/EX) block 202 by four lines. Once again these two blocks may be connected by a varying amount of lines. The ID/EX block 202 is situated in both the Decode 200 and Execute 300 stages, as it can carry out functionality of both these stages.

The ID/EX block 300 outputs four operand lines Ra, Rb, Rc and Rd and three operation code lines, opcodeA 310, opcodeB 320 and opcodeC 330. The Execute stage 300 also consists of three ALUs. Each ALU has two operand input lines and an operation code input line as well as an output. It will be appreciated that the inputs and outputs of the ALUs may be different but still embody the present invention. Furthermore, as will be described later, these ALUs may be varying in number and arranged in a variety of configurations whilst still embodying the present invention.

In FIG. 4, the three ALUs are cascaded. The ALU1 310 is connected to two of the operand lines, Ra and Rb, from the ID/EX block 202. ALU1 301 also receives an opcodeA line 310 from the ID/EX block 202. The output of ALU1 301 is connected to one of the operand input lines of ALU2 302. The second operand input of ALU2 302 is connected to the Rc operand output of ID/EX block 202. The operation code input of ALU2 302 is connected to opcodeB line 320 from the ID/EX block 202. The output of ALU2 302 is connected to one of the operand inputs of ALU3 303.

Similarly to ALU2 302, ALU3 303 receives its second operand input from the Rd operand line from ID/EX block 202. The operation code input of ALU3 303 is connected to opcodeC line 330 from ID/EX block 202. The output of ALU3 303 is connected to the Execute/Memory block 401. This block is situated in both the Execute 300 and Memory stage 400 as it can carry out the functionality of both stages.

As is apparent from FIG. 4, the Execute stage 200 of the pipeline consists of multiple ALUs. Each ALU is typically capable of simple arithmetic or logic operations. For example a typical ALU can be capable of performing AND, OR, NOT, XOR, addition, subtraction and bit shifting operation. ALUs may also be capable of multiplication and division. An ALU may be capable of performing a variety of other operation however those listed are of interest to the requirements of encryption/decryption algorithms. The operation code received by an ALU determines which of these operations it is to perform Because the Execute stage 200 of the pipeline consists of multiple ALUs, the Execute stage 200 is capable of carrying out several operations in one clock cycle. The output of one ALU forms the input of another ALU and so the configuration of ALUs shown in FIG. 4 is capable of performing multiple cascaded ALU operations together.

The functioning of the embodiment as shown in FIG. 4 will now be described with reference to the following algorithm. An example of the instructions used to implement the Multi-2 algorithm using embodiments of the present invention is shown below.
Step 2052
R1=XOR M1, M2
Step 2053
R2=ADD R1, K1
Step 2054
R3=ADD 1, (ADD R2, (ROTATE R2, 2))
Steps 2055 and 2056
R4=XOR K2, (XOR R3, (ROTATE R3, 4))
Step 2057
R5=ADD R4, K2
Step 2058
R6=ADD 1, (ADD R5, (ROTATE R5. 2)
Steps 2059 and 2060
R7=ADD K3, (XOR R6 (ROTATE R6, 8))
Step 2061
R8=ADD 1, (ADD R7, (ROTATE R7, 2))
Steps 2062 and 2063
R9=AND R8, R6
R10=XOR "WORK 2", (ADD R9, (ROTATE R8, 16))
Step 2064
R11=ADD R10, K4
Step 2065
R12=ADD 1, (ADD R11, (ROTATE R11, 2))
Step 2066
R13=XOR "WORK 1", R12
Step 2067
R14=XOR R13, "WORK 2"

The above algorithm contains 13 steps; however it only contains 14 instructions. Because the Execute stage of embodiments of the present invention is capable of executing several operations during one clock cycle, the instructions of the above algorithm may contain more than one operation.

FIG. 5 depicts an example of the instruction encoding of the pipeline of FIG. 4. Bits 52 to 47 of the encoded instruction contain a first operation code opcodeA, bits 46 to 41 contain a second operation code opcodeB, bits 40 to 36 contain a third operation code opcodeC, bits 35 to 31 contain a destination register Rz, bits 30 to 26 contain a first operand Ra, bits 25 to 21 contain a second operand Rb, bits 20 to 16 contain a third operand Rc, bits 15 to 11 contain a fourth operand Rd and bits 10 to 0 are reserved for extensions.

The pipeline of FIG. 4 starts functioning when the instruction of step 2052 is fetched from the instruction memory by the Fetch stage 100 in a first clock cycle. In the next clock cycle step 2052 moves into Decode stage 200 and step 2053 is fetched from the instruction memory. In Decode stage 200, operands M1 and M2 are determined and opcode XOR is extracted from the encoded instruction of step 2052. The remaining opcode B and opcode C and operands Rc and Rd are also extracted and may have values such that the output of ALU3 303 is the same as the output of ALU1 301.

In the next clock cycle, step 2052 moves into Execute stage 300, step 2053 moves onto Decode stage 200 and the instruction of step 2054 is fetched from the instruction memory. In the Decode stage 200, operands R1 and K1 are determined and ADD is extracted from the instruction of 2053. The instruction of 2052 is executed.

In the Execute stage 300, the opcodeA line carries XOR, the value extracted from step 2052. Operand lines A and B output M1 and M2. When ALU1 301 receives these values, it performs an operation on the two operands A and B as determined by the OperandA. In this case ALU1 301 performs XOR M1, M2. The output ALU1 301 is input into ALU2 302. In this case ALU2 302 receives values such that the output of ALU2 302 is equal to XOR M1, M2. This is also the case for ALU3 303 and the result of XOR M1, M2 is output to Execute/Memory (EX/MEM) block 401.

In the next clock cycle step 2054 is decoded and the instruction of step 2053 is executed. Step 2053 is executed similarly to step 2052 except in this case the value of opcodeA is ADD and Ra and Rb are R1 and K1 respectively.

The instruction of step 2054 contains multiple operations. Each operation requires the result of the previous operation. In the instruction of step 2054 a ROTATE must first be carried out. The result of ROTATE is used in a first ADD and the result of the first ADD is used in a second ADD. In Decode stage 200, the values of the encoded instruction for these operations are acquired. Opcode A, B and C are extracted. These take on the values Rotate, Add and Add respectively. Operands Ra, Rb, Rc and Rd are also determined. These take on the values of 2, R2, R2 and 1 respectively.

In the next clock cycle 2054 is executed. In Execute stage 300, the Instruction Decode/Execute block 202 outputs opcodeA, opcodeB and opcodeC and operands Ra, Rb, Rc and Rd to the respective ALUs. OpcodeA is output as ROTATE, opcode B and opcodeC are output as ADD. Thus ALU1 301 will perform a rotating operation and ALU2 302 and ALU3 303 will perform adding operations. The ID/EX block 202 outputs the value of R2 on line Ra, 2 on line Rb, the value of R2 on line Rc and 1 on line Rd.

As soon as ALU1 301 receives opcodeA and operands Ra and Rb, it rotates R2 by 2. In other words, it performs an operation determined by opcodeA on its operand inputs. As soon as this operation is performed, ALU1 301 outputs the result of the operation carried out by it to one of the operand inputs of ALU2 302. The other operand of ALU2 302 is Rc. As soon as ALU2 302 receives the result of the operation carried out by ALU1 301, it performs an operation on the received operands based on its received opcodeB. In other words, ALU2 302 adds the result of the operation carried out by ALU1 301 to Rc, which in this case is the value of R2.

As soon as ALU2 302 has performed the operation of opcodeB, it outputs the result to one of the operands of ALU3 303. ALU3 303 receives opcodeC from the ID/EX block 202 and 1 from line Rd. As soon as ALU3 303 receives the result of the operation carried out by ALU2 302, it performs an operation on that result and its received opcode as determined by opcodeC. In this case ALU3 303 adds one and the result of the operation carried out by ALU2 302 and outputs the result to EX/MEM block 401.

In the next clock cycle the pipeline continues. The operations 2051-2068 together comprise four rounds. This whole operation is done multiple times with different values for K1-K4. For example there may be 32 rounds (8 iterations of operations 2051-2068).

The instruction of step 2054 consists of a ROTATE and two ADD operations. Embodiments of the present invention such as that shown in FIG. 4 are capable of executing all three operations in one clock cycle. The ability of the embodiments of the present invention to execute instructions containing multiple operations in one clock cycle results in fewer instructions required for the implementation of the multi-2 algorithm.

When the Multi-2 algorithm is implemented by embodiments disclosed herein, an average of only three instructions per round are needed. Considering that only one clock cycle is needed to execute each instruction and the implementation of the multi-2 algorithm with the embodiments can reduce the number of instructions by a half, this is a considerable improvement in execution time.

It will however be appreciated that the concepts are not restricted to the embodiment of FIG. 4. The concepts may be implemented by varying numbers and configurations of ALUs. Multiple ALUs that receive at least one operand from a previous ALU or output a result to a further ALU may be configured in varying ways and consist of different amount of ALUs.

Figure 6:
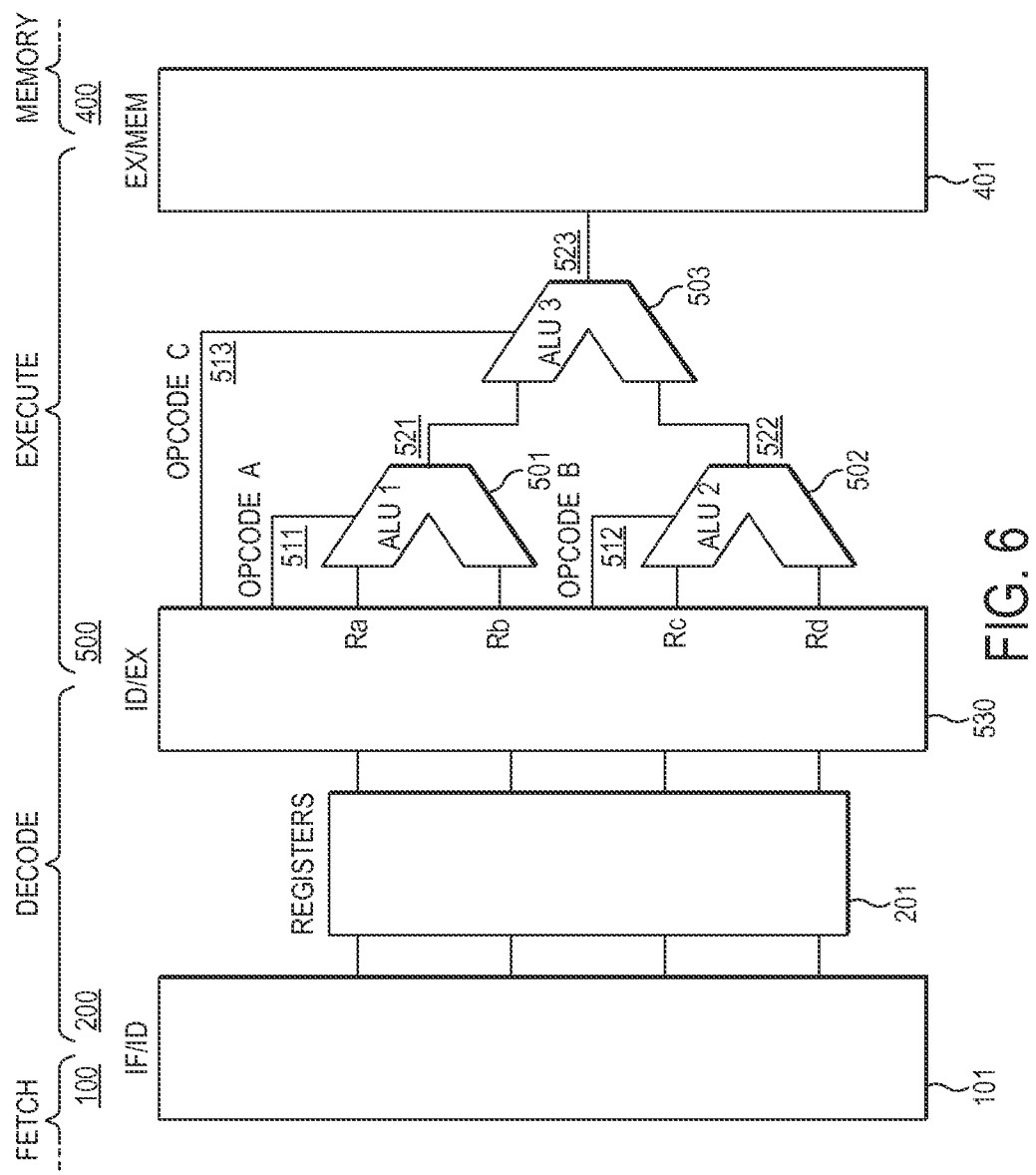
FIG. 6 schematically shows a pipeline in accordance with a further embodiment.

FIG. 6 depicts a further embodiment. The Fetch 100, Decode 200 and Memory 400 stages of FIG. 6 are identical to those of FIG. 4. FIG. 6 illustrates a different configuration of the ALUs in the Execute stage 500. It is to be assumed that the pipeline of FIG. 6 is identical to that of FIG. 4 except for the differences as described below.

FIG. 6 shows a modification to the Execute stage of a pipeline. Execute stage 500 consists of Instruction Decode/Execute (ID/EX) block 530. The ID/EX block 530 has four operand outputs to output operands Ra, Rb, Rc and Rd and three operation code outputs opcodeA 511, opcodeB 512 and opcodeC 513. The Execute stage 500 also consists of three ALUs, ALU1 501, ALU2 502 and ALU3 503.

Each ALU has two operand inputs and an operation code input. Each ALU also has an output to output the result of an operation. The two operand inputs of ALU1 501 receive operands Ra and Rb from ID/EX block 530. The operation code input of ALU1 501 receives opcodeA 511 from ID/EX block 530. The output of ALU1 501 in connected to one of the operand inputs of ALU3 503.

The two operand inputs of ALU2 502 receive operands Rc and Rd from ID/EX block 530. The operation code input of ALU2 502 receives opcodeB 512 from ID/EX block 530. The output of ALU2 502 is connected to the other operand input of ALU3 503.

ALU3 503 receives the output of ALU1 501 and the output of ALU2 502 as its two operand inputs. The operation code input of ALU3 503 receives opcodeC 513 from ID/EX block 530. The output of ALU3 503 is connected to Execute/Memory (AX/MEM) block 401.

The Fetch 100, Decode 200, Memory 400 and Write-back (not shown) stages of the pipeline of FIG. 6 operate similarly to those of FIG. 4. This description will focus on Execute stage 500 of FIG. 6. The functioning of the pipeline in FIG. 6 will be described with reference to the algorithm described above.

The embodiment of FIG. 6 is applicable to rounds that include instructions like that of the following instruction

R11=ROTATE R10, 16
R12=AND R10, R7
R12=ADD R11, R12

The encoded instruction to carry out the above three operations is shown in FIG. 7. OpcodeA contains ROTATE and Ra and Rb take on the value of R10 and 2 respectively. Opcode B contains ADD and Rc and Rd take on the value of R10 and R7 respectively.

When this instruction reaches the Execute stage 500, ALU1 501 receives Ra and Rb and opcodeA from Instruction Decode/Execute block 530. Once ALU1 501 receives these values it performs an operation determined by opcodeA on its two operands. In this case ALU1 501 rotates the value of R10 with 16. Once the operation is performed ALU1 501 outputs the result of the operation to ALU3 503.

ALU2 502 receives operands Rc and Rd and opcodeB from ID/EX block 530. Once ALU2 502 receives these values it performs an operation determined by opcodeB on its two operands. In this case ALU2 502 ANDs the value of R10 and R7. Once the operation is performed ALU2 502 outputs the result of the operation to ALU3 503.

ALU3 503 does not receive any operands from ID/EX block 530. ALU3 503 receives an operand from ALU1 501 and an operand from ALU2 502. ALU3 503 further receives opcodeC from ID/EX block 530. Once ALU3 503 has received opcodeC and both its operands, it carries out an operation on the two operands as determined by opcodeC. In this case it adds the result of the operation carried out by ALU1 501 and the result of the operation carried out by ALU2 502. The result of this operation is then output to Execute/Memory block 401.

The embodiment as shown in FIG. 6 may execute several operations in one clock cycle.

FIG. 4 is an example of a cascaded configuration of ALUs and FIG. 6 is an example of a tree configuration of the ALUs. The cascade/tree configuration may be selectable. Some stages of an algorithm may use a linear cascade formation, while others may benefit from a tree such as step 2062 of the multi-2 algorithm. For example one stage would benefit from a 4-stage cascade rather than a 3-stage one, and one stage would benefit from a tree. In both cases, the benefit would be a reduction in the number of instructions required to execute the algorithm. Because of the small benefit gained from adding additional ALUs, a 3-stage cascade configuration might be implemented (unless support for another algorithm was required which needed another ALU configuration) as the best trade off of code speed versus design area (cost) for implementing the Multi-2 algorithm. However in different scenarios, with different algorithms, different trade offs may be made.

The configuration of the ALUs may be selectable at run-time. The benefits of various configurations may be determined according to the algorithm that is to be run and the appropriate configuration selected during run-time. This allows flexibility in the algorithm that may be run efficiently. Alternatively the configuration to be used may be pre-selected for the algorithm.

It is apparent, that although the two embodiments described have a different configuration of ALUs in the Execute stage of the pipeline, they both achieve the advantages of the present invention.

Embodiments may form an encryption/decryption engine. Embodiments may be a processor or implemented on an integrated circuit or chip set.

Although the embodiments have been described in terms of encryption/decryption algorithms, it will be readily appreciated that embodiments may be applied to any algorithm sharing the identified characteristics of encryption/decryption algorithms. For example, embodiments may be applied to hashing algorithms, audio and video codecs and digital signal processing algorithms.

Embodiments may provide a modification to the Execute stage of a pipeline to improve its performance when running encryption/decryption algorithms. Embodiments may exploit the characteristic of the encryption/decryption algorithm by allowing several operations to be executed in a single execute stage. Furthermore in embodiments, the result of an operation becomes immediately available to be used by a further operation. This may reduce the number of instruction needed to implement a round of an encryption/decryption algorithm.

While improving the speed of the pipeline, embodiments also allow for the processor to remain relatively generic and allow flexibility. As is discussed above, each ALU in the Executes stage 300 of the pipeline receives an operation code input which determines the operation to be carried out by the ALU. Embodiments may improve the performance characteristics of a certain type of algorithm, however embodiments are not restricted to a single algorithm.

The operation input of each ALU may be determined by the instruction which it is to carry out and is selected independently from the operation code of the other ALUs in the pipeline. This allows for flexibility in the algorithm carried out by the embodiments.

Embodiments can be used in scenarios other than those described. For example, the invention may be implemented where there is at least one step which is arranged to perform a plurality of instructions where one instruction requires the output of a previous instruction.

The embodiments are described herein by way of reference to particular non-limiting examples. One skilled in the art will understand the general applicability of the embodiments. The scope of protection afforded is defined in the appended claims.

What is claimed is:

1. An apparatus, comprising:
a plurality of arithmetic logic units configured to execute an algorithm comprising a plurality of single instructions, a given single instruction of the plurality thereof including therein a first operation code, a second operation code, a third operation code, and at least one operand;

wherein the plurality of arithmetic logic units are switchable between a tree configuration and a cascade configuration based upon the algorithm, with each arithmetic logic unit being arranged to carry out an operation determined by a received operation code on the at least one received operand, wherein a first one of the arithmetic logic units is configured to carry out a first operation defined by the first operation code and output a first result;

wherein a second one of the arithmetic logic units is configured to carry out a second operation defined by the second operation code to output a second result;

wherein a third one of the arithmetic logic units is configured to carry out a third operation defined by the third operation code so as to output a third result, wherein the third one of the arithmetic logic units receives the first and second results as operand inputs when the plurality of arithmetic logic units are in the tree configuration; and wherein the third one of the arithmetic logic units receives the second result as an operand input and the second one of the arithmetic logic units receives the first result as an operand input when the plurality of arithmetic logic unit are in the cascade configuration.

2. The apparatus of claim 1, further comprising a control unit configured to supply an operand to an operand input of the first one of the arithmetic logic units.

3. The apparatus of claim 2, wherein the first, second, and third operations are carried out by the first, second, and third ones of the arithmetic logic units during a single clock cycle; and wherein the control unit is configured to decode the given single instruction containing the first, second, and third operation codes and said at least one operand in an immediately preceding single clock cycle.

4. The apparatus of claim 2, wherein the control unit is further configured to supply another operand to another operand input of the first one of the arithmetic logic units.

5. The apparatus of claim 4, wherein the given single instruction includes encoded therein the first operation code, the second operation code, the operand, and the another operand; and wherein the control unit is configured to decode the given single instruction.

6. The apparatus of claim 1, wherein the control unit is further configured to supply another operand to another operand input of the second one of the arithmetic logic units.

7. The apparatus of claim 6, wherein the given single instruction has encoded therein the first operation code, the second operation code, and the another operant; and wherein the control unit is configured to decode the given single instruction.

8. The apparatus of claim 1, wherein the first, second, and third operation codes form a round.

9. The apparatus of claim 1, as implemented in an integrated circuit.

10. The apparatus of claim 1, as implemented in an encryption/decryption engine.

11. The apparatus of claim 1, as implemented in an execution stage of a pipeline.

12. The apparatus of claim 1, wherein the first, second, and third operations are carried out by the first, second, and third logic units during a single clock cycle.

13. An execution stage, comprising:
an instruction decoder configured to decode a given single instruction of an algorithm comprising a plurality of single instructions, the given single instruction including a first opcode, a second opcode, a third opcode, and at least one operand in a single first clock cycle;
a first arithmetic logic unit configured to receive the first opcode and said at least one operand, the first arithmetic logic unit adapted to perform an arithmetic logic operation defined by the first opcode on said at least one operand to output a first output operand;
a second arithmetic logic unit configured to receive the second opcode, the second arithmetic logic unit adapted to perform an arithmetic logic operation defined by the second opcode to output a second output operand;
a third arithmetic logic unit being switchable between a tree configuration with the first and second arithmetic logic units and a cascade configuration with the first and second arithmetic logic units based upon the algorithm;
wherein the third arithmetic logic unit, when in the tree configuration, is configured to receive the third opcode, the first output operand, and the second output operand, and to perform an arithmetic logic operation defined by the third opcode on the first output operand and the second output operand to output a third output operand; and
wherein the third arithmetic logic unit, when in the cascade configuration, is configured to receive the third opcode and the second output operand, and to perform an arithmetic logic operation defined by the third opcode on the second output operand to output said third output operand, said second arithmetic logic unit configured to receive the first output operand as an input in the cascade configuration.

14. The execution stage of claim 13, wherein the arithmetic logic operations are carried out by the first, second, and third arithmetic logic units during a single second clock cycle immediately following said single first clock cycle.

15. The execution stage of claim 14, wherein the arithmetic logic operations are carried out by the first, second, and third arithmetic logic units during said single second clock cycle immediately following said single first clock cycle.

16. An execution stage, comprising:
an instruction decoder configured to decode a given single instruction of an algorithm comprising a plurality of single instructions, the given single instruction having encoded therein a first operand, a second operand, a third operand, a first opcode, a second opcode, and a third opcode;
a first arithmetic logic unit configured to receive the first opcode and the first and second operands, the first arithmetic logic unit adapted to perform a first arithmetic logic operation defined by the first opcode on said first and second operands to output a fourth operand;
a second arithmetic logic unit being switchable between a tree configuration with the first arithmetic logic unit and a third arithmetic logic unit, and a cascade configuration with the second arithmetic logic unit and the third arithmetic logic unit based upon the algorithm;
wherein the second arithmetic logic unit, when in the tree configuration, is configured to receive the second opcode, the third operand, and a fifth operand, and adapted to perform a second arithmetic logic operation defined by the second opcode on the third and fifth operands to output a sixth operand;
wherein the second arithmetic logic unit, when in the cascade configuration, is configured to receive the second opcode and the third and fourth operands, and adapted to perform a second arithmetic logic operation defined by the second opcode on the third and fourth operands to output a seventh operand;
the third arithmetic logic unit being switchable between a tree configuration with the first and second arithmetic logic units and a cascade configuration with the first and second arithmetic logic units based upon the algorithm;
wherein the third arithmetic logic unit, when in the tree configuration, is configured to receive the third opcode and the fourth and sixth operands and to perform a third arithmetic logic operation defined by the third opcode on the fourth and sixth operands to output an eighth operand; and
wherein the third arithmetic logic unit, when in the cascade configuration, is configured to receive the third opcode, the seventh operand, and a ninth operand and to perform a third arithmetic logic operation defined by the third opcode on the seventh and ninth operands to output a tenth operand.

17. The execution stage of claim 16, wherein the first, second, and third arithmetic logic operations corresponding to the decoded instruction are carried out by the first, second, and third arithmetic logic units during a same single clock cycle.

18. The execution stage of claim 17, wherein the instruction decoder decodes the instruction in an immediately preceding clock cycle.

19. A method, comprising:
decoding, in a single first clock cycle, a given instruction of an algorithm comprising a plurality of single instructions, the given single instruction having encoded therein a first operand, a second operand, a first opcode, a second opcode and a third opcode;
performing a first arithmetic logic operation defined by the first opcode on said first and second operands to output a fourth operand;
switching a second arithmetic logic unit between a configuration with the first arithmetic logic unit and a third arithmetic logic unit, and a cascade configuration with the first arithmetic logic unit and the third arithmetic logic unit based upon the algorithm;
performing a second arithmetic logic operation defined by the second opcode on the third operand and a fifth operand to output a sixth operand, when the second arithmetic logic unit is in the tree configuration;

performing a second arithmetic logic operation defined by the second opcode on the third and fourth operands to output a seventh operand, when the second arithmetic logic unit is in the cascade configuration;

switching a third arithmetic logic unit between a tree configuration with the first and second arithmetic logic units and a cascade configuration with the first and second arithmetic logic units based upon the algorithm;

performing a third arithmetic logic operation defined by the third opcode on the fourth and sixth operands to output an eighth operand, when the third arithmetic logic unit is in the tree configuration; and performing a third arithmetic logic operation defined by the third opcode on the seventh operand and a ninth operand to output a tenth operand, when the third arithmetic logic unit is in the cascade configuration;

wherein performing the first and second arithmetic logic operations corresponding to the decoded instruction comprises carrying out the first and second arithmetic logic operations on corresponding first and second arithmetic logic units during a same single clock cycle;

wherein performing the third arithmetic logic operation, when in the tree configuration, corresponding to the decoded instruction comprises carrying out the third arithmetic logic operation on the third arithmetic logic unit; and wherein performing the third arithmetic logic operation, when in the cascade configuration, corresponding to the decoded instruction comprises carrying out the third arithmetic logic operation on the third arithmetic logic unit.

* * * * *